N. H. BROWN.
REFLECTING LANTERN.
APPLICATION FILED NOV. 4, 1909.

954,408.

Patented Apr. 5, 1910.
2 SHEETS—SHEET 2.

UNITED STATES PATENT OFFICE.

NATHANIEL H. BROWN, OF PHILADELPHIA, PENNSYLVANIA, ASSIGNOR TO HENRY S. WILLIAMS, NATHANIEL H. BROWN, AND MORRIS EARLE, TRADING AS WILLIAMS, BROWN AND EARLE, OF PHILADELPHIA, PENNSYLVANIA, A FIRM.

REFLECTING-LANTERN.

954,408.  Specification of Letters Patent.  Patented Apr. 5, 1910.

Application filed November 4, 1909. Serial No. 526,193.

*To all whom it may concern:*

Be it known that I, NATHANIEL H. BROWN, a citizen of the United States, residing at the city of Philadelphia, in the county of Philadelphia and State of Pennsylvania, have invented certain new and useful Improvements in Reflecting-Lanterns, of which the following is a specification.

My invention relates first, to a reflecting lantern so arranged as that an object or subject printed or mounted on transparent and opaque grounds can be quickly exposed for transference in illumined form of such object or subject to a distant sheet or screen; and second, to lighting means in conjunction with a reflector, operative together or independently of each other, so as to interchangeably be enabled to quickly regulate the beam or volume of light presented to the subject or object exposed in the lantern mounted upon an opaque or transparent ground.

The nature and characteristic features of my present invention will be more fully understood from the following description taken in connection with the accompanying drawings forming part hereof, in which—

Figure 1:
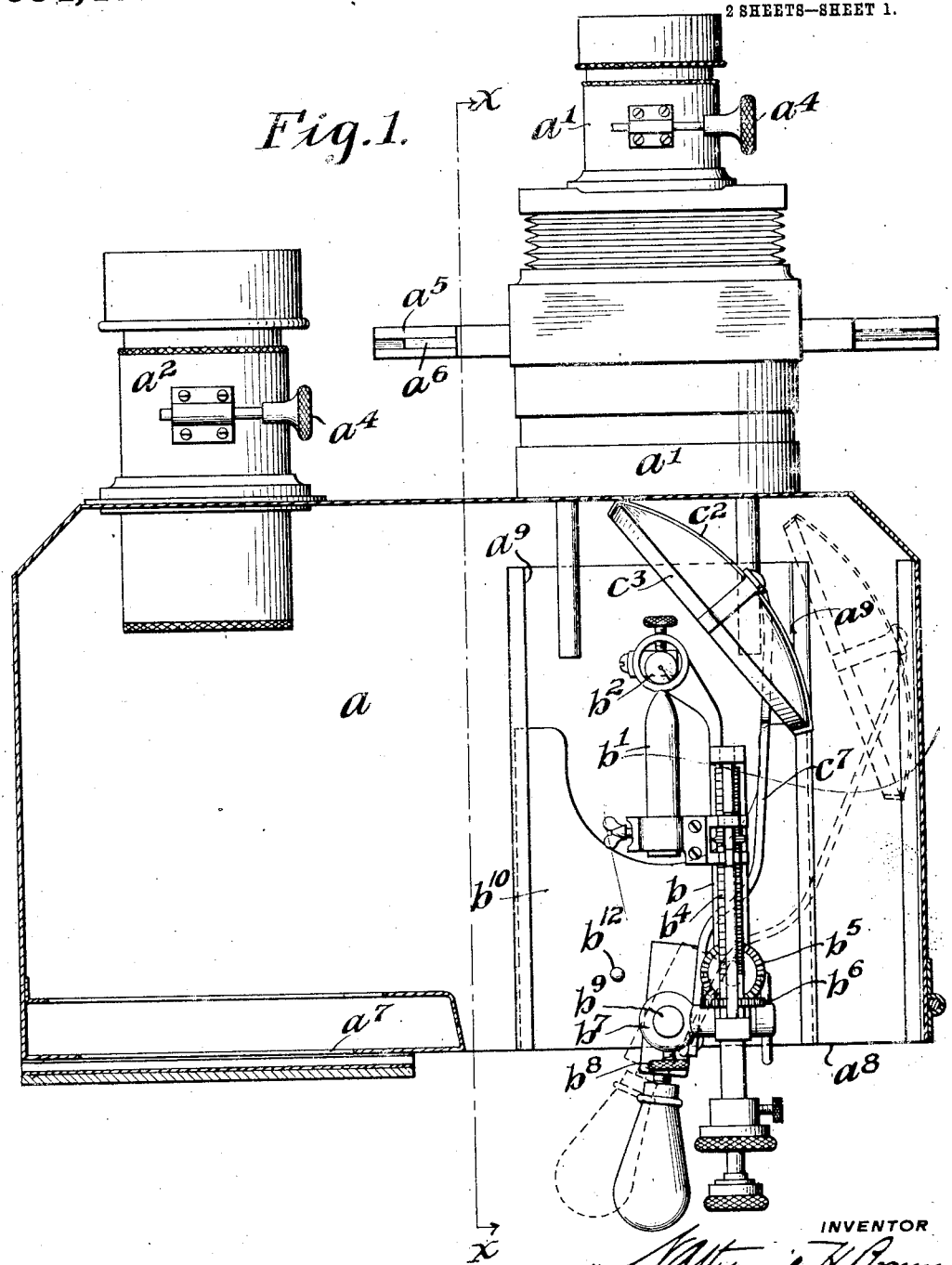
Figure 2:
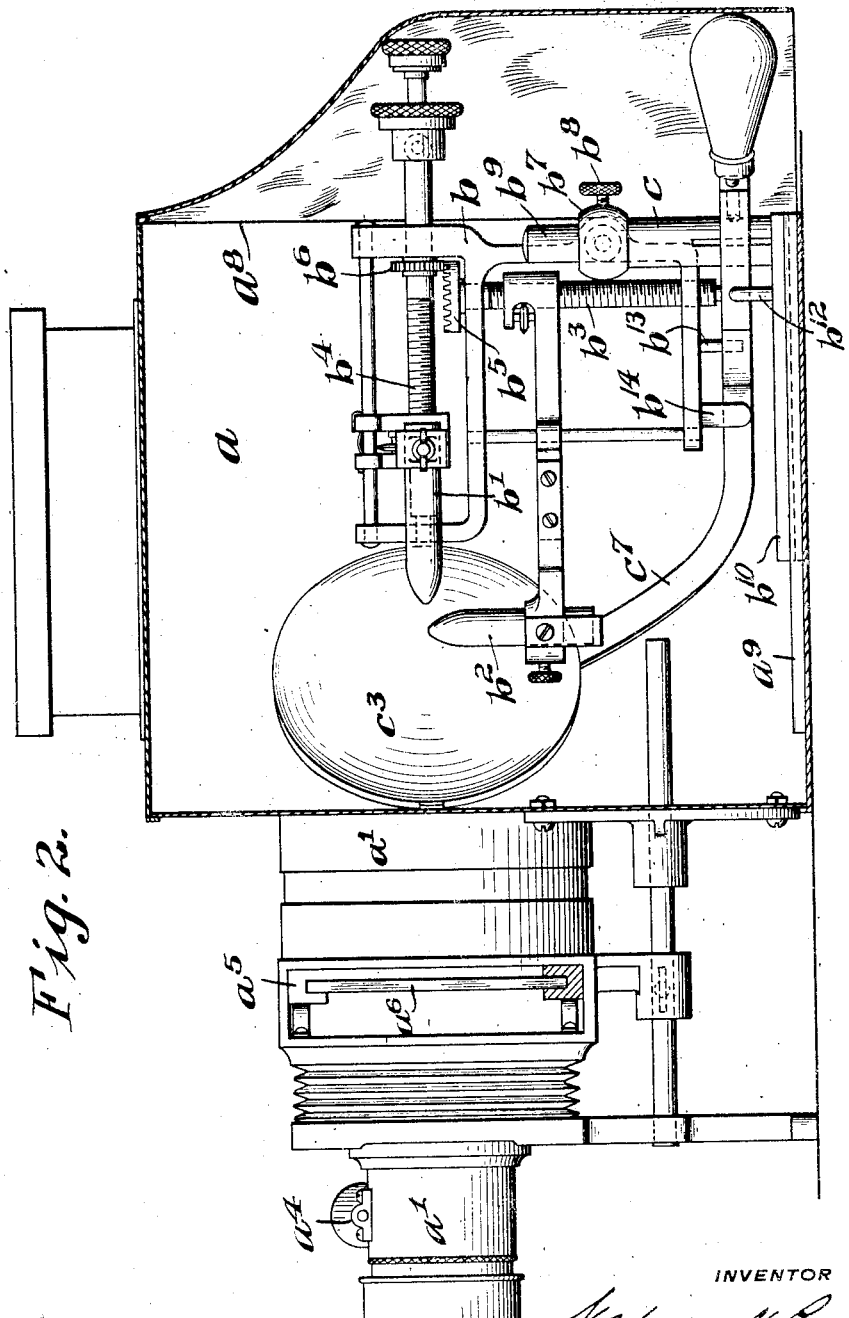

Figure 1, is a view in top or plan and in transverse central section of a lantern, embodying main features of my present invention; and Fig. 2, is a view in vertical section on the line $x, x$, of Fig. 1.

Referring to the drawings $a$, is the light and reflector house for the double purpose of interchangeably exposing subjects or objects therefrom printed or mounted respectively, on transparent and opaque grounds.

$a^1$ and $a^2$ respectively, are the tubes projecting from the house $a$, for suitably mounting proper lenses for different effects or results and having devices $a^4$, for controlling the same. In the rear portion of the lens tube $a^1$, is provided a cross-opening provided with a slide $a^5$, for shifting along the same a subject or object mounted on a transparent plate $a^6$.

$a^7$ and $a^8$, are openings in the rear wall of the house $a$. The opening $a^7$, has arranged above and below the same grooved strips to form slides or ways for inserting and shifting along the same a subject or object on cardboard or an opaque body, as a post-card or the like.

$b$ is an arc-light carrier bracket, for the carbons $b^1$, $b^2$, located as shown, at right angles to each other in connection with the bracket and to be operated up and down and back and forth on threaded vertical and longitudinal rods $b^3$ and $b^4$, mounted in the bracket $b$, by means of spur-gears $b^5$ and $b^6$, through the manual operation of the rod $b^4$, beyond the threaded portion thereof. This bracket is provided with a bearing $b^7$, and a thumb-screw $b^8$, for detachably engaging and disengaging said bearing to a post $b^9$, secured to a recessed slide-plate $b^{10}$, arranged to be slid back and forth in a grooved way $a^9$, arranged interiorly, in the bottom of the light and reflector house $a$. On the post $b^9$, carrying the arc light or lamp bracket $b$, is also mounted by means of a sleeve $c$, an irregular curved arm $c^1$. This arm carries a skeleton or spider frame $c^2$, to receive a concaved face reflector $c^3$, as clearly shown in Fig. 1. Projecting from the recessed plate $b^{10}$, is a stop $b^{12}$, and projecting downward from the frame of the bracket $b$, are stops $b^{13}$ and $b^{14}$. These stops serve to limit the movement back and forth of the reflector $c^3$, either to the right or left of the arc-light or lamp bracket $b$, or conjointly with the bracket, as may be required, to shift the reflector out of the way of the arc-light for the use of the lens tube $a^1$, or in conjunction with the lamp bracket $b$, for the proper reflecting effects from the reflector $c^3$, and at the required angle of deflection for exposing the subject or object of the opaque slide to or through the lens tube $a^2$, as will be clearly apparent and readily understood from Fig. 1. The opening $a^8$, in the rear of the house $a$, and through which the recessed plate $b^{10}$, carrying the arc-light attachment and shiftable reflector $c^3$, as a part thereof, may be provided with a flexible flap or curtain arranged to rest suspended from the house $a$, when desired, and to close the opening $a^8$, in the housing $a$, when required.

Having thus described the nature and objects of my invention, what I claim as new and desire to secure by Letters Patent is:—

1. A lantern of the character described, comprising a lamp-house, two tubes projecting from the front of said house, lenses adjustably mounted in said tubes, a holder for opaque objects at the rear of one of said tubes, a holder for transparencies in the other of said tubes, a plate shiftable into and from said house, a lighting attachment, supporting means for said lighting-attachment and a reflector movably connected with said supporting means, substantially as and for the purposes described.

2. A lantern of the character described, comprising a lamp-house, two tubes projecting from the front of said house, lenses mounted in said tubes, a holder for opaque objects in the rear of one of said tubes, a holder for transparencies in the other of said tubes, a plate shiftable into and from said house, a lighting-attachment, supporting means for said attachment, a reflector movably connected with said supporting means and means to permit of shifting said reflector independently of the movement of said attachment, substantially as and for the purposes described.

3. A lantern of the character described, comprising a lamp-house, two tubes projecting from the front of said house, lenses mounted in said tubes, a holder for opaque objects in the rear of one of said tubes, a holder for transparencies in the other of said tubes, a plate shiftable into and from said house, an arc-light attachment, supporting means for said attachment, a reflector movably connected with said supporting means and means to permit said attachment and reflector to be shifted, in unison, into required position, substantially as and for the purposes described.

4. A lantern of the character described, comprising a lamp-house, two tubes projecting from the front of said house, lenses mounted in said tubes, a holder for opaque objects in the rear of one of said tubes, a holder for transparencies in the other of said tubes, a plate shiftable into and from said house, a lighting attachment, supporting means for said attachment, a reflector movably connected with said supporting means, means to permit said attachment and reflector to be shifted, in unison, into required position and means to shift the carbons of said lighting-attachment without disturbing the position of said reflector with respect to that of said lighting-attachment, substantially as and for the purposes described.

In witness whereof, I have hereunto set my signature in the presence of two subscribing witnesses.

NATHANIEL H. BROWN.

Witnesses:
THOMAS M. SMITH,
ELISABETH A. SHELDRAKE.